United States Patent
Luo

(10) Patent No.: US 12,531,440 B2
(45) Date of Patent: Jan. 20, 2026

(54) WIRELESS POWER TRANSFER SYSTEM AND CONTROL METHOD THEREOF

(71) Applicant: NuVolta Technologies (Hefei) Co., Ltd., Hefei (CN)

(72) Inventor: Zhijun Luo, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 684 days.

(21) Appl. No.: 17/969,997

(22) Filed: Oct. 20, 2022

(65) Prior Publication Data

US 2023/0134591 A1 May 4, 2023

(30) Foreign Application Priority Data

Oct. 29, 2021 (CN) .......................... 202111273455.7

(51) Int. Cl.
| | | |
|---|---|---|
| *H02J 50/60* | (2016.01) | |
| *G01R 23/00* | (2006.01) | |
| *H02J 7/00* | (2006.01) | |
| *H02J 50/12* | (2016.01) | |

(52) U.S. Cl.
CPC ............ *H02J 50/60* (2016.02); *G01R 23/005* (2013.01); *H02J 7/00712* (2020.01); *H02J 50/12* (2016.02)

(58) Field of Classification Search
CPC .. H02J 50/60; H02J 50/12; H02J 50/10; H02J 7/00712; G01R 23/005
USPC .......................................... 320/108; 307/104
See application file for complete search history.

(56) References Cited

U.S. PATENT DOCUMENTS

| | | | | |
|---|---|---|---|---|
| 9,671,444 | B2 * | 6/2017 | Tsai | H02J 5/00 |
| 9,921,045 | B2 * | 3/2018 | Sieber | H02J 50/12 |
| 10,488,543 | B2 * | 11/2019 | Shao | H02J 7/00034 |
| 10,840,745 | B1 * | 11/2020 | Maniktala | H02J 50/60 |
| 11,031,818 | B2 * | 6/2021 | Danilovic | H02H 3/44 |
| 11,146,112 | B1 * | 10/2021 | Luo | H02M 7/5387 |
| 11,398,752 | B2 * | 7/2022 | Goodchild | G01V 3/10 |
| 11,462,944 | B2 * | 10/2022 | Goodchild | H02M 3/335 |
| 11,689,058 | B2 * | 6/2023 | Luo | H02J 50/12 |
| | | | | 307/104 |
| 12,160,121 | B2 * | 12/2024 | Enderlin | H02J 50/12 |
| 2012/0313579 | A1 * | 12/2012 | Matsumoto | H02J 7/00304 |
| | | | | 320/108 |

FOREIGN PATENT DOCUMENTS

| | | | | |
|---|---|---|---|---|
| CN | 102763306 | A | 10/2012 | |
| CN | 108375797 | A * | 8/2018 | ............... G01V 3/06 |
| CN | 111245107 | A | 6/2020 | |

* cited by examiner

*Primary Examiner* — Jared Fureman
(74) *Attorney, Agent, or Firm* — AP3 Law Firm PLLC

(57) ABSTRACT

A wireless power transfer system and a control method thereof. The wireless power transfer system includes: a transmitter coil configured to be magnetically coupled to a receiver coil; a power conversion device coupled to the transmitter coil; and a controller including a one-half cycle detection block, wherein the one-half cycle detection block is configured to establish a current sensing time instant, and wherein at the current sensing time instant, a current flowing through the transmitter coil is detected and compared to a predetermined threshold to perform foreign object detection to determine whether a foreign object is coupled to the wireless power transfer system.

16 Claims, 6 Drawing Sheets

WIRELESS POWER TRANSFER SYSTEM AND CONTROL METHOD THEREOF

PRIORITY CLAIM

This disclosure claims the benefit of and priority to Chinese Patent Application No. 202111273455.7, filed on Oct. 29, 2021, which is hereby incorporated by reference in its entirety.

TECHNICAL FIELD

The present invention relates to the technical field of electronic circuits, and, in particular embodiments, to a wireless power transfer system and control method thereof.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

Power loss of the wireless power transfer system is an important parameter. For example, a foreign object detection (FOD) can be performed using the calculated power loss. Additional circuits are needed in conventional wireless power transfer system to detect parameters such as an input current and a coil current to realize power loss detection and foreign object detection.

It would be desirable to have a simple and reliable control mechanism to reduce cost of power loss detection.

SUMMARY

These and other problems are generally solved or circumvented, and technical advantages are generally achieved, by preferred embodiments of the present disclosure which provide a wireless power transfer system and control method thereof.

In accordance with an embodiment, a wireless power transfer system is provided, comprising: a transmitter coil configured to be magnetically coupled to a receiver coil; a power conversion device coupled to the transmitter coil; and a controller including an one-half cycle detection block configured to set up a current sensing time instant corresponding to one half of switching cycle of the power converter device, and wherein at the current sensing time instant, a current flowing through the transmitter coil is detected and compared with a predetermined threshold to perform foreign object detection, so as to determine whether a foreign object is coupled to the wireless power transfer system.

In accordance with another embodiment, a control method of a wireless power transfer system is provided, comprising: finding a time instant corresponding to one half of the switching cycle in the switching cycle of power converter of the wireless power transfer system; at the time instant, comparing the current flowing through the transmitter coil with the predetermined threshold to perform foreign object detection, so as to determine whether a foreign object is coupled to the wireless power transfer system.

In accordance with yet another embodiment, a controller is provided, including an one-half cycle detection block configured to set up a current sensing time instant corresponding to one half of the switching cycle of the power conversion device, and wherein at the current sensing time instant, the current flowing through the transmitter coil can be detected and compared with a predetermined threshold to perform foreign object detection, so as to determine whether a foreign object is coupled to the wireless power transfer system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure. The present disclosure will be described with respect to preferred embodiments in a specific context, namely a foreign object detection device for a wireless power transfer system. The invention may also be applied, however, to a variety of power systems. Hereinafter, various embodiments will be explained in detail with reference to the accompanying drawings.

Figure 1:
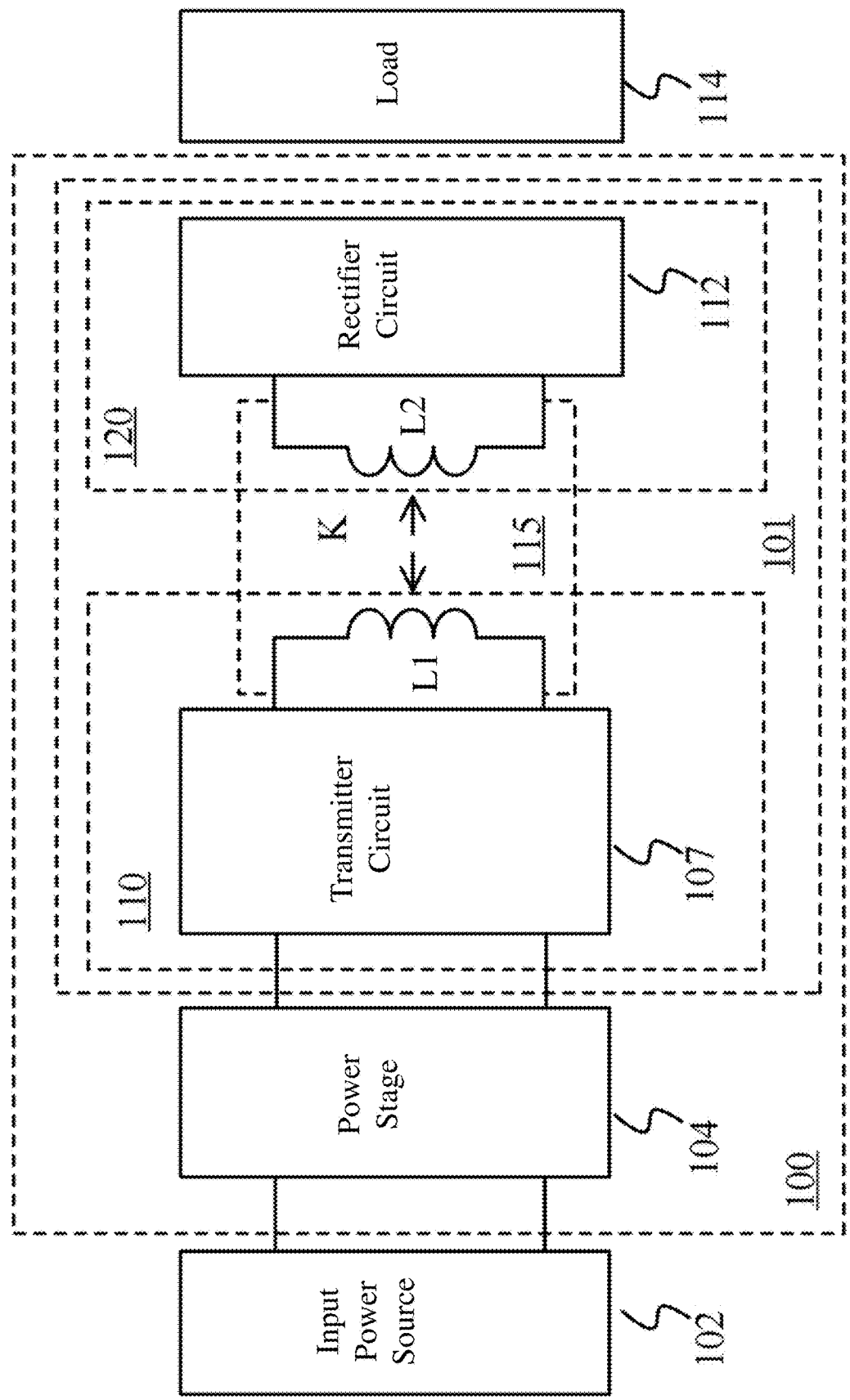
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power stage 104 and a wireless power transfer device 101 connected in cascade between an input power source 102 and a load 114. The wireless power transfer device 101 includes a transmitter 110 and a receiver 120. As shown in FIG. 1, the transmitter 110 comprises a transmitter circuit 107 and a transmitter coil L1 connected in cascade. The input of the transmitter circuit 107 is coupled to an output of the power stage 104. The receiver 120 comprises a receiver coil L2 and a rectifier 112 connected in cascade. The output of the rectifier 112 is coupled to the load 114.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, power may be transferred from the transmitter 110 to the receiver 120.

In some embodiments, the transmitter 110 may be inside a charging pad. The transmitter coil is placed underneath the top surface of the charging pad. The receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120.

The transmitter circuit 107 may comprise primary side switches of a full-bridge power converter according to some embodiments. The full-bridge is also known as an H-bridge. Alternatively, the transmitter circuit 107 may comprise the primary side switches of other converters such as a half-bridge converter, a push-pull converter and the like. The detailed configuration of the transmitter circuit 107 will be described below with respect to FIG. 2.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier 112. The receiver 120 may comprise a secondary resonant capacitor.

The rectifier 112 converts an alternating polarity waveform received from the output of the receiver coil L2 to a single polarity waveform. In some embodiments, the rectifier 112 is implemented as a synchronous rectifier including four switches. In alternative embodiments, the rectifier 112 comprises a full-wave diode bridge and an output capacitor.

Furthermore, the synchronous rectifier may be formed by any controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed structure of the rectifier 112 will be discussed below with respect to FIG. 2.

The power stage 104 is coupled between the input power source 102 and the input of the wireless power transfer device 101. Depending design needs and different applications, the power stage 104 may comprise many different configurations. In some embodiments, the power stage 104 may be a non-isolated power converter such as a buck converter. In some embodiments, the power stage 104 may be implemented as a linear regulator. In some embodiments, the power stage 104 may be an isolated power converter such as a forward converter.

The implementation of the power stage 104 described above is merely an example, which should not unduly limit the scope of the claims. One of ordinary skill in the art would recognize many variations, alternatives, and modifications. Furthermore, depending on different applications and design needs, the power stage 104 may be an optional element of the wireless power transfer system 100. In other words, the input power source 102 may be connected to the transmitter circuit 107 directly.

Figure 2:
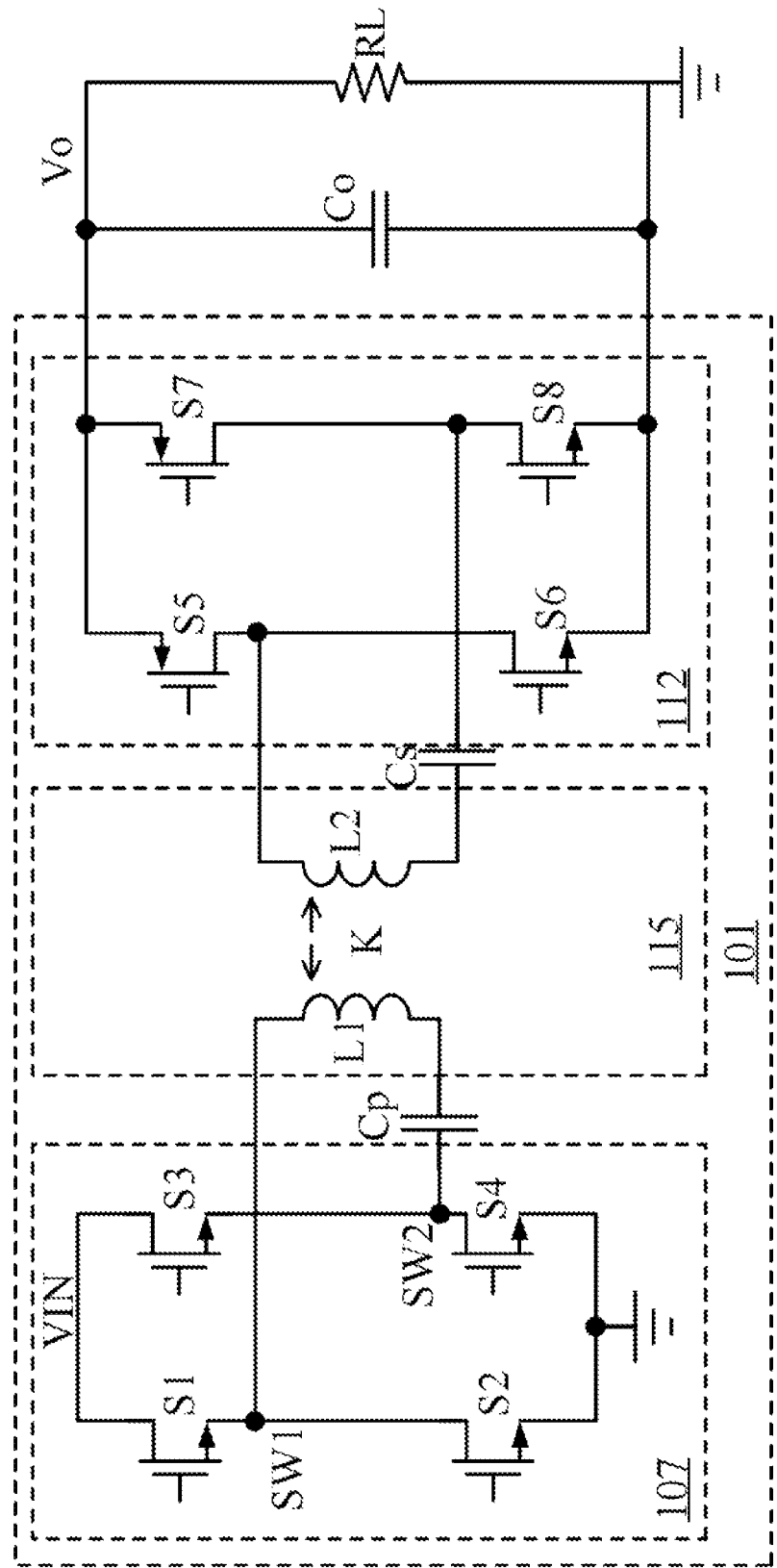
FIG. 2 illustrates a schematic diagram of the wireless power transfer system shown in FIG. 1 in accordance with various embodiments of the present disclosure.

FIG. 2 illustrates a schematic diagram of the wireless power transfer system shown in FIG. 1 in accordance with various embodiments of the present disclosure. The wireless power transfer device 101 comprises a transmitter circuit 107, a resonant capacitor Cp, a loosely coupled transformer 115, a resonant capacitor Cs and a rectifier 112 connected in cascade. The loosely coupled transformer 115 is formed by the transmitter coil L1 and the receiver coil L2. The transmitter circuit 107 is implemented as a full-bridge as shown in FIG. 2. Throughout the description, the full-bridge shown in FIG. 2 may be alternatively referred to as a power converter or a full-bridge power converter.

The full-bridge 107 includes four switching elements, namely S1, S2, S3 and S4. As shown in FIG. 2, the switching elements S1 and S2 are connected in series between an input voltage bus VIN and ground. The input voltage bus VIN is connected to the output of the power stage 104 shown in FIG. 1. Likewise, the switching elements S3 and S4 are connected in series between the input voltage bus VIN and ground. The common node (SW1) of the switching elements S1 and S2 is coupled to a first input terminal of the transmitter coil L1. The common node (SW2) of the switching elements S3 and S4 is coupled to a second input terminal of the transmitter coil L1 through the resonant capacitor Cp. The voltage between SW1 and SW2 is denoted as VSW. The waveform of VSW will be illustrated below with respect to FIG. 4.

According to some embodiments, the switching elements S1, S2, S3 and S4 are implemented as MOSFET or MOSFETs connected in parallel, any combinations thereof and/or the like. According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge 107 shown in FIG. 2), the implementation of the transmitter circuit 107 shown in FIG. 2 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge 107 illustrated herein is limited solely for the purpose of clearly illustrating the inventive aspects of the various embodiments. The present invention is not limited to any particular power topology.

It should further be noted that while FIG. 2 illustrates four switches S1-S4, various embodiments of the present disclosure may include other variations, modifications and alternatives. For example, a separate capacitor may be connected in parallel with each switch of the full-bridge 107. Such a separate capacitor helps to better control the timing of the resonant process of the full-bridge 107.

The outputs of the receiver coil L2 are coupled to the load RL through the resonant capacitor Cs, the rectifier 112 and a capacitor Co. The rectifier converts an alternating polarity waveform received from the outputs of the receiver coil L2 to a single polarity waveform. The capacitor Co is employed to attenuate noise and provide a steady output voltage. The resonant capacitor Cs helps to achieve soft switching for the wireless power transfer system.

In some embodiments, the rectifier 112 is implemented as a synchronous rectifier. The rectifier 112 includes four switching elements, namely S5, S6, S7 and S8. As shown in FIG. 2, the switching elements S5 and S6 are connected in series between the output terminal of the rectifier 112 and ground. Likewise, the switching elements S7 and S8 are connected in series between the output terminal of the rectifier 112 and ground. As shown in FIG. 2, the common node of the switching elements S5 and S6 is coupled to a first terminal of the receiver coil L2. The common node of the switching elements S7 and S8 is coupled to a second terminal of the receiver coil L2 through the resonant capacitor Cs.

According to some embodiments, the switching elements S5, S6, S7 and S8 are implemented as MOSFET or MOSFETs connected in parallel, any combinations thereof and/or the like.

Referring back to FIG. 1, in the related art, foreign object detection is required during wireless power transfer. There are many ways to detect foreign objects, such as detecting capacitance, resistance, power loss, etc. The power loss detection method is to determine whether there is a foreign object around the wireless power transfer system by detecting whether the power loss deltaP between the transmitter 110 and the receiver 120 is less than a threshold. Specifically, deltaP=Pt−Pr, wherein Pt is the transmit power of the transmitter 110, and Pr is the receive power of the receiver 120. When using the power loss detection method to detect foreign objects, it is necessary to precisely detect Pt and Pr, so as to accurately determine whether there is a foreign object around the wireless power transfer system. However, it is difficult to precisely detect Pt and Pr.

Therefore, the present application improves the power loss detection method, which simplifies the calculation of power loss. Specifically, the power loss equation deltaP=Pt−Pr=[Pi−Pt$^{(loss)}$]−[Po−Pr$^{(loss)}$] is used, wherein Pt is the transmit power of the transmitter 110, Pr is the receive power of the receiver 120, Pi is the input power of the system, Pt$^{(loss)}$ is the power loss at the input terminal, Po is the output power of the system, and Pr$^{(loss)}$ is the power loss at the output terminal. This application provides a simple method for calculating Pt$^{(loss)}$, which can take into account the simplicity and accuracy of the power loss calculation at the input terminal. If Pi, Po and Pr$^{(loss)}$ are known, Pt$^{(loss)}$ can be easily calculated to obtain the power loss deltaP, so as to determine whether the power loss is less than the threshold and whether a foreign object is around the wireless power transfer system. The relationship between the power loss of the transmitter and the current flowing through the transmitter coil is described below with respect to FIG. 3.

Figure 3:
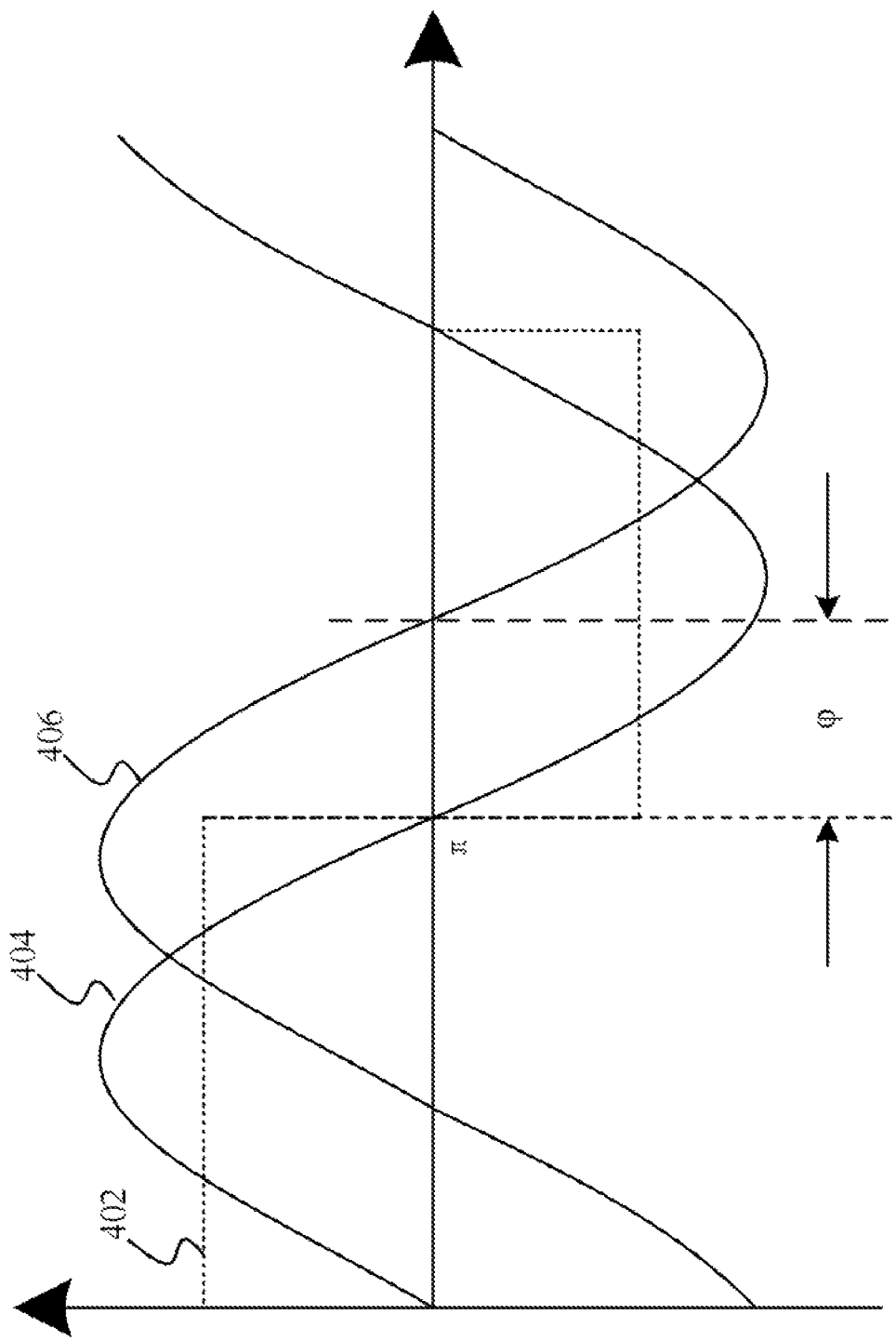
FIG. 3 illustrates various waveforms of the wireless power transfer system shown in FIG. 1 in accordance with various embodiments of the present disclosure.

FIG. 3 illustrates various waveforms of the wireless power transfer system shown in FIG. 1 in accordance with various embodiments of the present disclosure. The horizontal axis of FIG. 3 represents the time interval. The first waveform 402 represents VSW (the voltage between the two switch nodes SW1 and SW2 shown in FIG. 2). The second waveform 404 represents a fundamental frequency waveform of the first waveform 402. The third waveform 406 represents the current flowing through the transmitter coil.

As shown in FIG. 3, the current flowing through the transmitter coil lags behind the voltage (a fundamental frequency waveform of the first waveform 402), the phase difference between voltage and current is expressed as ø.

Transmitter power loss includes coil loss, power switch loss and resonant capacitor loss. The above three losses are equivalent to the AC equivalent resistance of the transmitter coil multiplied by the current. Assuming the AC equivalent resistance is ACR, the transmitter power loss is ACR*$Icoil_{rms}$^2, wherein $Icoil_{rms}$ is the rms value of the transmitter coil current.

Define the current flowing through the transmitter coil as equation (1):

$$Icoil(\theta) = \sqrt{2} * Icoil_{rms} \sin(\theta - \varphi) = \alpha_1 \sin(\theta) + \alpha_2 \cos(\theta) \quad (1)$$

The transmitter coil current can be divided into two parts, including an active power and a reactive power, which can be expressed as equation (2):

$$Icoil_{rms}^2 = Icoil\alpha_{rms}^2 + Icoilr_{rms}^2 \quad (2)$$

wherein, $Icoil\alpha_{rms}^2$ represents the active power part, and $Icoilr_{rms}^2$ represents the reactive power part.

The active power part of the transmitter coil current can be expressed as equation (3):

$$Icoila_{rms} = \frac{Pin}{V_{rms}} = \frac{\pi}{2\sqrt{2}} * IIN \quad (3)$$

wherein, IIN represents the input current of the transmitter coil.

The current at time instant π of the transmitter coil current can be expressed as equation (4):

$$Icoil(\pi) = \sqrt{2} * Icoil_{rms} \sin(\pi - \varphi) = \sqrt{2} * Icoil_{rms} \sin(\varphi) \quad (4)$$

Then, the reactive power part of the transmitter coil current can be expressed as equation (5):

$$Icoilr_{rms} = \frac{Pin_r}{V_{rms}} = \frac{V_{rms} * Icoil_{rms} \sin(\varphi)}{V_{rms}} = \frac{Icoil(\pi)}{\sqrt{2}} \quad (5)$$

Therefore, the transmitter coil current can be expressed as equation (6):

$$Icoil_{rms}^2 = \frac{\pi^2 * IIN^2}{8} + \frac{Icoil(\pi)^2}{2} \quad (6)$$

In the related art, a complicated equation needs to be used to calculate the power loss between the transmitter 110 and the receiver 120 (for example, the power loss is calculated by using the voltage), so as to further perform foreign object detection.

The present disclosure provides an improved detection circuit, which can easily obtain the power loss of the input terminal, so as to calculate the power loss deltaP between the transmitter 110 and the receiver 120, achieving the purpose of foreign object detection.

In operation, in each switching cycle, finding the time instant corresponding to the one half of the switching cycle. At this time instant, the current flowing through the transmitter coil is detected. Based on the detected current, it can be calculated and determined accordingly whether the power loss of the transmitter coil is greater than the threshold, and the purpose of foreign object detection can be achieved based on the determined result.

In operation, the detected current is compared with a predetermined threshold. In some embodiments, the threshold of a present cycle is set based on the threshold of a previous cycle. If the detected current is greater than the predetermined threshold, there is a foreign object around, and a protection mechanism for foreign object detection is activated. The detailed implementation of the detection circuit provided by the present disclosure will be described below with reference to FIGS. 4-6.

Figure 4:
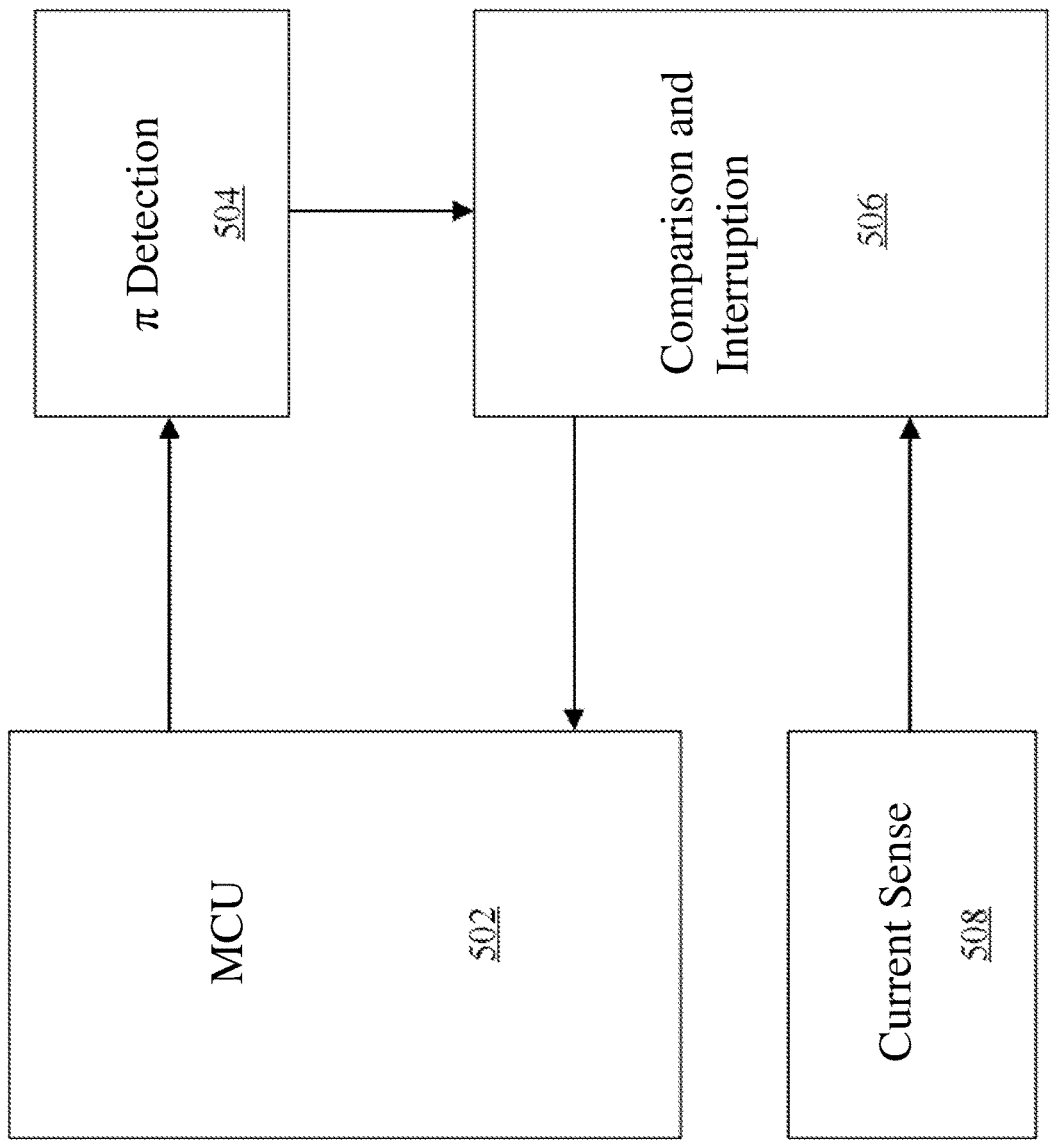
FIG. 4 illustrates a block diagram of a controller in accordance with various embodiments of the present disclosure.

FIG. 4 illustrates a block diagram of a controller in accordance with various embodiments of the present disclosure. The controller comprises a microcontroller unit (MCU) 502, a π detection block 504, a comparison and interruption block 506 and a current sense block 508. This controller can realize the function of foreign object detection.

The MCU 502 sets up an integer equivalent to one half of the switching cycle of the power converter. The MCU 502 feeds this integer to the π detection block 504. The input terminal of the current sense block 508 is directly or indirectly connected to the transmitter coil, so as to sense the current flowing through the transmitter coil.

In every switching cycle of the power converter, the π detection block 504 detects a falling edge of one PWM signal applied to the full-bridge, and sends the falling edge to the comparison and interruption block 506. The comparison and interruption block 506 receives the falling edge of the PWM signal and detects the current (Icoil) flowing through the transmitter coil at the time instant equivalent to one half of the switching cycle. The detected current (current flowing through the transmitter coil) is fed into the comparison and interruption block 506. The detected current is compared with the predetermined threshold. If a foreign object exists nearby, the comparison and interruption block 506 generates a corresponding interrupt signal and feed this interrupt signal to the MCU 502. The MCU 502 applies a corresponding control mechanism to the wireless power transfer system to control the wireless power transfer system not to enter the power transfer mode, or to stop performing power transfer. For example, MCU 502 applies the corresponding control mechanism to a power converter, so that the power converter stops performing power conversion.

Figure 5:
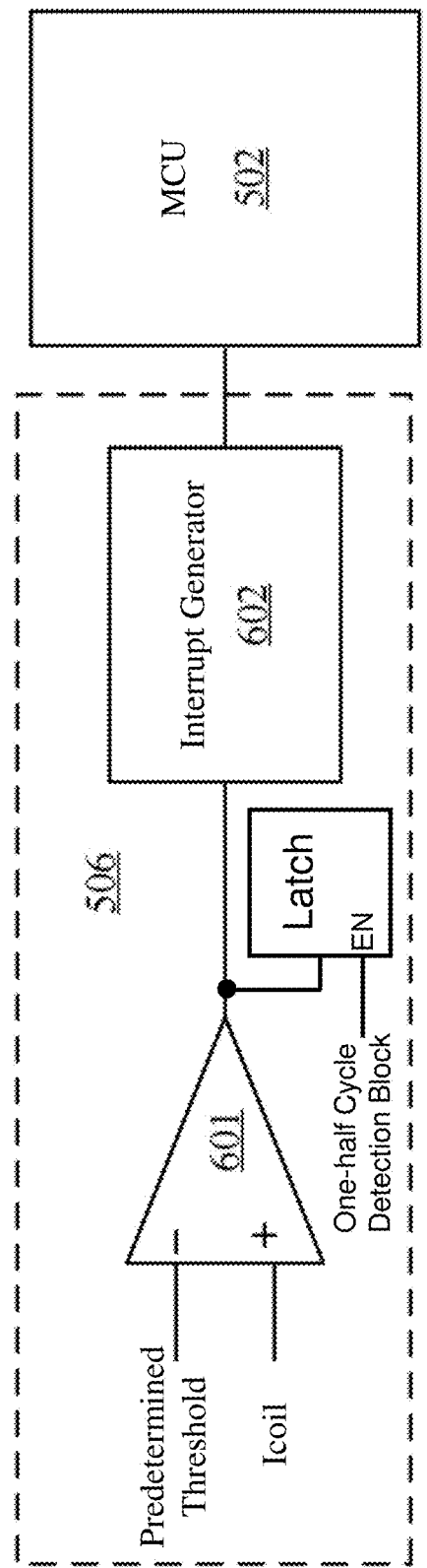
FIG. 5 illustrates a schematic diagram of a comparison and interruption block in accordance with various embodiments of the present disclosure.

FIG. 5 illustrates a schematic diagram of the comparison and interruption block in accordance with various embodiments of the present disclosure. The comparison and interruption block 506 comprises a first comparator 601 and a first interrupt generator 602. As shown in FIG. 5, the inverting input of the first comparator 601 is coupled to a predetermined threshold. The predetermined threshold is used to determine whether foreign objects are present around the wireless power transfer system. The non-inverting input of the first comparator 601 is coupled to the current (Icoil) flowing through the transmitter coil. The comparison and interruption block includes: a comparator configured to compare the current flowing through the transmitter coil with the predetermined threshold; a latch configured to latch comparison results of the comparator, and wherein an enable terminal of the latch is connected to the one-half cycle detection block to provide comparison results at the current sensing time instant; and an interrupt generator configured to provide the interrupt signal according to the comparison results.

It should be noted that the comparison and interruption block 506 discussed herein is provided for illustrative purposes only, and is provided only as an example of the functionality that may be included in the comparison and interruption block 506. One of ordinary of skill in the art would realize that the comparison and interruption block 506 may be implemented in many different ways, and it may include other function blocks.

Figure 6:
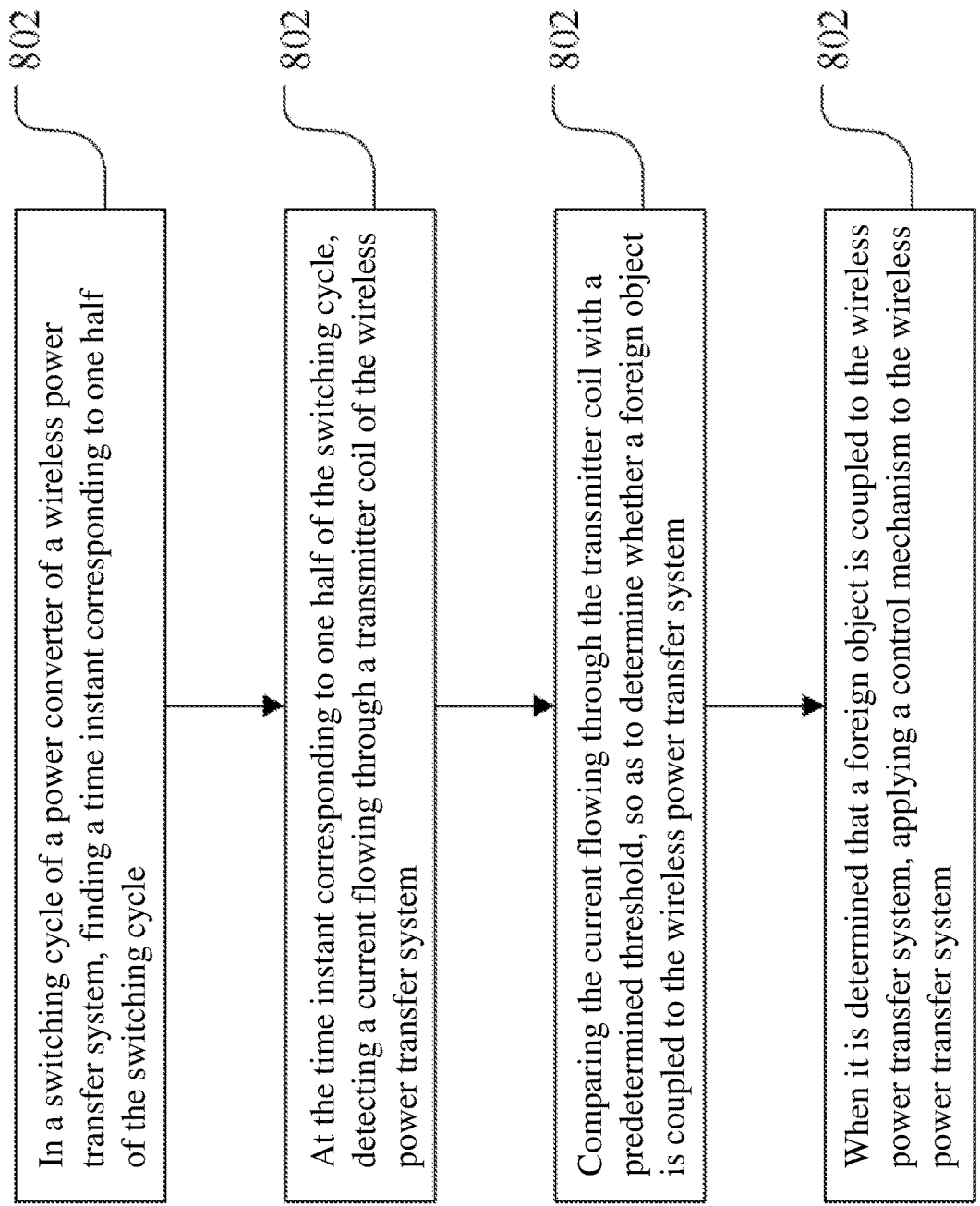
FIG. 6 illustrates a flow chart of a method for controlling the wireless power transfer system shown in FIG. 1 in accordance with various embodiments of the present disclosure.

FIG. 6 illustrates a flow chart of a method for controlling the wireless power transfer system shown in FIG. 1 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

A wireless power transfer system comprises a transmitter and a receiver. The transmitter comprises a power converter and a transmitter coil. The receiver comprises a receiver coil and a rectifier. The transmitter coil is magnetically coupled to the receiver coil.

In operation, the power loss of the wireless power transfer system increases when there are foreign objects around the wireless power transfer system.

A controller is employed to detect the current flowing through the transmitter coil at a time instant corresponding to one half of a switching cycle of the power converter, the detected current of this time instant can determine whether a foreign object is around the wireless power transfer system. When the detected current is greater than the predetermined threshold, it is determined that a foreign object is around the wireless power transfer system.

At step 802, in a switching cycle of the power converter of the wireless power transfer system, finding a time instant corresponding to one half of the switching cycle. For instance, in the switching cycle of power converter, the falling edge of a gate drive signal of the power converter is used as the time instant corresponding to one half of the switching cycle.

At step 804, at the time instant corresponding to one half of the switching cycle, the current flowing through the transmitter coil of the wireless power transfer system is detected.

At step 806, the detected current flowing through the transmitter coil is compared with the predetermined threshold to perform foreign object detection, so as to determine whether a foreign object is coupled to the wireless power transfer system. For example, the predetermined threshold of present cycle is updated based on the predetermined threshold of previous cycle.

At step 808, a control mechanism is applied to the wireless power transfer system when it is determined that a foreign object is coupled to the wireless power transfer system. In particular, when it is determined that a foreign object is coupled to the wireless power transfer system, the interrupt signal is generated and sent to the power converter device, in order to control the wireless power transfer system not to enter power transfer mode, or to stop performing power transfer.

In other embodiments, according to a comparison result of a comparison between the current flowing through the transmitter coil and the predetermined threshold, the wireless power transfer system is controlled not to enter the power transfer mode, or to stop performing power transfer.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A wireless power transfer system comprising:
 a transmitter coil configured to be magnetically coupled to a receiver coil;
 a power conversion device coupled to the transmitter coil; and
 a controller, including a one-half cycle detection block configured to set up a current sensing time instant corresponding to one half of a switching cycle of the power conversion device, and wherein at the current sensing time instant, a current flowing through the transmitter coil is detected and compared with a predetermined threshold to perform foreign object detection to determine whether a foreign object is coupled to the wireless power transfer system.

2. The wireless power transfer system of claim 1, wherein:
 the power conversion device is a full-bridge converter, a half-bridge converter or a push-pull converter.

3. The wireless power transfer system of claim 1, wherein:
 the controller is configured to prevent the wireless power transfer system from entering a power transfer mode, or to stop performing power transfer when the controller determines that the foreign object is coupled to the wireless power transfer system.

4. The wireless power transfer system of claim 1, wherein:
 the controller further comprises a comparison and interruption block configured to compare the current flowing through the transmitter coil with the predetermined threshold to perform the foreign object detection at the current sensing time instant, and wherein when the comparison and interruption block determines that the foreign object is coupled to the wireless power transfer system, an interrupt signal is generated to prevent the wireless power transfer system from entering a power transfer mode, or to stop performing power transfer.

5. The wireless power transfer system of claim 4, wherein:
 the controller is configured to update the predetermined threshold of a present cycle according to the predetermined threshold of a previous cycle.

6. The wireless power transfer system of claim 4, wherein the comparison and interruption block includes:
 a comparator configured to compare the current flowing through the transmitter coil with the predetermined threshold;
 a latch configured to latch comparison results of the comparator, and wherein an enable terminal of the latch is connected to the one-half cycle detection block to provide comparison results at the current sensing time instant; and
 an interrupt generator configured to provide the interrupt signal according to the comparison results.

7. The wireless power transfer system of claim 4, wherein the controller further comprises:
 a current sense unit configured to sense the current flowing through the transmitter coil; and
 a microcontroller unit configured to control whether the wireless power transfer system performs power transfer according to the interrupt signal.

8. The wireless power transfer system of claim 1, wherein:
the controller is configured to update the predetermined threshold of a present cycle according to the predetermined threshold of a previous cycle.

9. A control method of a wireless power transfer system comprising:
   in a switching cycle of a power converter in the wireless power transfer system, finding a time instant corresponding to one half of the switching cycle; and
   at the time instant, comparing a current flowing through a transmitter coil with a predetermined threshold to perform foreign object detection to determine whether a foreign object is coupled to the wireless power transfer system.

10. The control method of claim 9, wherein:
    once the foreign object is coupled to the wireless power transfer system, an interrupt signal is generated and sent to the wireless power transfer system to prevent the wireless power transfer system from entering a power transfer mode, or to stop performing power transfer.

11. The control method of claim 9, further comprising:
    updating the predetermined threshold of a present cycle according to the predetermined threshold of a previous cycle.

12. The control method of claim 9, further comprising:
    in the switching cycle of the power converter, using a falling edge of a gate drive signal of the power converter as the time instant corresponding to the one half of the switching cycle.

13. The control method of claim 9, further comprising:
    comparing the current flowing through the transmitter coil with the predetermined threshold; and
    once the foreign object is coupled to the wireless power transfer system, generating an interrupt signal and sending the interrupt signal to the wireless power transfer system to prevent the wireless power transfer system from entering a power transfer mode, or to stop performing power transfer.

14. The control method of claim 9, further comprising:
    performing the foreign object detection before the wireless power transfer system enters a power transfer mode or when the wireless power transfer system is performing power transfer.

15. A controller comprising:
    a one-half cycle detection block configured to set up a current sensing time instant corresponding to one half of a switching cycle of a power conversion device, wherein at the current sensing time instant, a current flowing through a transmitter coil is detected and compared with a predetermined threshold to perform foreign object detection to determine whether a foreign object is coupled to a wireless power transfer system.

16. The controller of claim 15, further comprising:
    a current sense unit configured to sense the current flowing through the transmitter coil;
    a comparison and interruption block configured to compare the current flowing through the transmitter coil with the predetermined threshold to perform the foreign object detection at the current sensing time instant; and
    a microcontroller unit configured to control whether the wireless power transfer system performs power transfer according to an interrupt signal.

* * * * *